(12) United States Patent
DeMello

(10) Patent No.: US 8,056,287 B2
(45) Date of Patent: Nov. 15, 2011

(54) WEATHERSTRIP WITH RELEASABLE PROTECTIVE COVERING

(75) Inventor: Alan J. DeMello, Newmarket, NH (US)

(73) Assignee: Ultrafab, Inc., Farmington, NY (US)

( * ) Notice: Subject to any disclaimer, the term of this patent is extended or adjusted under 35 U.S.C. 154(b) by 594 days.

(21) Appl. No.: 11/800,559

(22) Filed: May 7, 2007

(65) Prior Publication Data
US 2007/0264466 A1    Nov. 15, 2007

Related U.S. Application Data

(60) Provisional application No. 60/800,390, filed on May 15, 2006.

(51) Int. Cl.
*E06B 7/16* (2006.01)
(52) U.S. Cl. .................. 49/482.1; 49/475.1; 49/460
(58) Field of Classification Search .............. 49/482.1, 49/475.1, 460; 428/89, 92, 95
See application file for complete search history.

(56) References Cited

U.S. PATENT DOCUMENTS

| | | | | |
|---|---|---|---|---|
| 2,249,424 | A * | 7/1941 | Hanington | 428/103 |
| 3,175,256 | A | 3/1965 | Horton | |
| 3,416,981 | A | 12/1968 | Figaro | |
| 3,759,439 | A * | 9/1973 | Cross et al. | 383/205 |
| 3,850,471 | A * | 11/1974 | Johnson | 296/156 |
| 4,078,106 | A | 3/1978 | Lind | |
| 4,113,103 | A * | 9/1978 | Carlsson | 229/234 |
| 4,148,953 | A | 4/1979 | Horton | |
| 4,239,114 | A * | 12/1980 | Denay | 229/314 |
| 4,305,984 | A | 12/1981 | Boyce | |
| 4,699,818 | A * | 10/1987 | Evans et al. | 428/85 |
| 4,868,027 | A * | 9/1989 | Hunkeler et al. | 428/42.3 |
| 5,023,122 | A * | 6/1991 | Boeckmann et al. | 428/43 |
| 5,093,181 | A * | 3/1992 | Sanchez | 428/167 |
| 5,109,793 | A | 5/1992 | Ballejos | |
| 5,242,712 | A | 9/1993 | Miller | |
| 5,260,097 | A | 11/1993 | Silvestre | |
| 5,338,382 | A | 8/1994 | Johnson et al. | |
| 5,421,936 | A | 6/1995 | Cox et al. | |
| 5,489,459 | A | 2/1996 | Nauman | |
| 5,611,173 | A | 3/1997 | Headrick et al. | |
| 5,807,451 | A | 9/1998 | Johnson | |
| 5,817,390 | A | 10/1998 | Johnson | |

(Continued)

FOREIGN PATENT DOCUMENTS

JP        06100021 A  *  4/1994

*Primary Examiner* — Jerry Redman
(74) *Attorney, Agent, or Firm* — George R. McGuire; David B. Woycechowsky; Bond Schoeneck & King

(57) ABSTRACT

A pile weatherstrip has a pile of yarn ultrasonically welded to a backing strip inside a channel defined by flanges, called pile directors, which direct the pile perpendicularly with respect to the backing. A film provides a covering for the pile and is releasably attached to the flanges on the outside thereof. The covering film may have perforations therein which are located adjacent to the flanges near the upper ends of the flanges. Alternatively, a weak ultrasonic weld of the covering to the flanges, such as made at much lower energy than used to weld the pile and the backing together, provides a releasable attachment for the covering. The covering protects the pile, for example during installation in a frame which may be painted after the weatherstrip is installed. The covering can be released by being pulled off the pile director flanges after installation and painting.

14 Claims, 2 Drawing Sheets

U.S. PATENT DOCUMENTS

| | | | |
|---|---|---|---|
| 5,914,169 A * | 6/1999 | Brunetto | 428/99 |
| 6,210,446 B1 | 4/2001 | Elliott | |
| 6,294,240 B1 * | 9/2001 | Brunetto | 428/99 |
| 7,055,692 B2 * | 6/2006 | Waga et al. | 206/497 |
| 7,335,412 B2 * | 2/2008 | Wylie | 428/88 |
| 2002/0162766 A1 * | 11/2002 | Saso et al. | 206/497 |
| 2003/0223770 A1 * | 12/2003 | De Kesel et al. | 399/106 |
| 2007/0094934 A1 * | 5/2007 | Albanese et al. | 49/475.1 |
| 2007/0286982 A1 * | 12/2007 | Higgins et al. | 428/95 |

\* cited by examiner

WEATHERSTRIP WITH RELEASABLE PROTECTIVE COVERING

Priority is claimed to U.S. Provisional Application Ser. No. 60/800,390, filed May 15, 2006.

The present invention relates to weatherstripping and improves such weatherstripping by facilitating protection of the sealing member thereof during installation, especially when the frame of the fenestration product (window, door, etc.) in which the weatherstrip is installed is painted in the area of the weatherstripping.

The invention is especially adapted for protection of the pile providing the sealing member of weatherstrip in which the pile is attached to a backing strip having a channel on the inside of flanges constituting walls of the channel, such flanges sometimes being called pile directors. Such weatherstrips are described in the following patents: Horton, U.S. Pat. Nos. 3,175,256 and 4,148,953 and Johnson, U.S. Pat. Nos. 5,338,382, 5,807,451, and 5,817,390.

In accordance with the invention, the weatherstrips have a thin flexible film covering the pile wherein the film is releasably attached to the outside of the pile directors. The releasable attachment may be via perforations in and along the film immediately above the upper ends of the pile directors, or with weak, ultrasonic welds which are made with much lower energy (and heating) than the welds attaching the pile to the backing. When installed as in a T-Slot of a frame, the covering of the pile provided by the film is readily released and removed after installation or painting.

Protective covering or masks, such as of adhesively backed material have been used to protect carpets, thresholds, floorboards, gaskets and the like, especially during painting operations. See Elliott, U.S. Pat. No. 6,210,446, April 2001; Headrick et al., U.S. Pat. No. 5,611,173, March 1997; Nauman, U.S. Pat. No. 5,489,459, February 1996; Cox et al., U.S. Pat. No. 5,421,936, June 1995; Silvestre, U.S. Pat. No. 5,260,097, November 1993; Miller, U.S. Pat. No. 5,242,712, September 1993; Ballejos, U.S. Pat. No. 5,109,793, May 1992; and Figaro, U.S. Pat. No. 3,416,981, December 1968. Weatherstrips sometimes include fin material to facilitate formation of the seal provided by a sealing member, such as a yarn pile. See Lind, U.S. Pat. No. 4,078,106, March 1978 and Boyce, U.S. Pat. No. 4,305,984, December 1981. However, the novel functionality and advantageous attachment of a releasable or removable covering, with the aid of the pile directors of pile weatherstripping, is an important contribution provided by this invention.

In accordance with the presently preferred embodiment of the invention, a pile weatherstrip has a pile of yarn ultrasonically welded to a backing strip inside a channel defined by flanges, called pile directors, which direct the pile perpendicularly with respect to the backing. A film covers the pile and is releasably attached to the flanges on the outside thereof. The film attachment may have perforations located along the outsides of the flanges adjacent the upper edges thereof. Alternatively, the film may be attached to the flanges by a weak ultrasonic weld made at much lower energy than used to weld the pile and the backing together. The cover protects the pile, for example during installation in a frame which may be painted after the weatherstrip is installed, and the cover can be released or removed by being pulled off the pile directors after installation and painting.

The foregoing and other features and advantages of the invention will become more apparent from the following description and drawings, in which.

Figure 3:
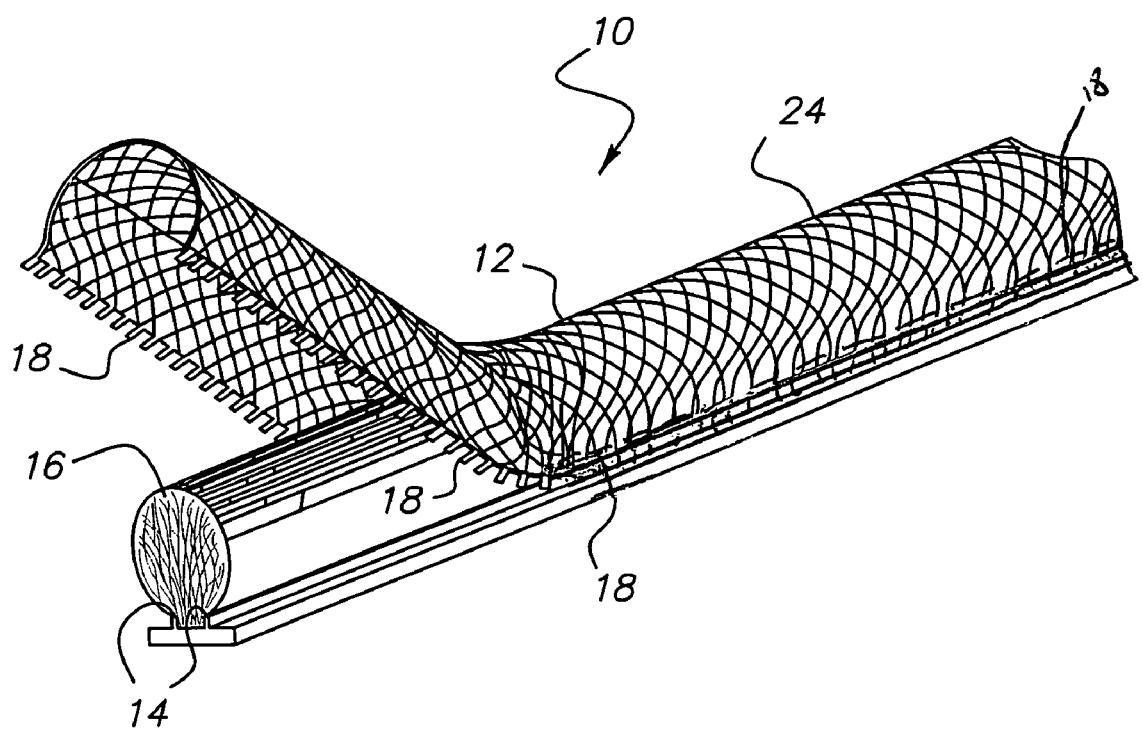
FIG. 3 is a perspective view illustrating the covering of a weatherstrip provided by the invention in the process of being released from the weatherstrip.

The drawings show a pile weatherseal which may be made in accordance with the above referenced Horton and Johnson patents with a protective covering or cladding member 12 over the pile 16. The weatherseal is referred to as an ULTRA MASK™ weatherseal. The covering 12, as shown in FIG. 3, is a film or sheet of thin plastic material, similar to that used in providing fins inside or outside the pile in the above referenced Horton or Johnson patents, is ultrasonically welded to the outside of the pile directors (flanges) 14. The film is looped over and covers the pile 16 to provide the releasable covering 12.

Figure 2:
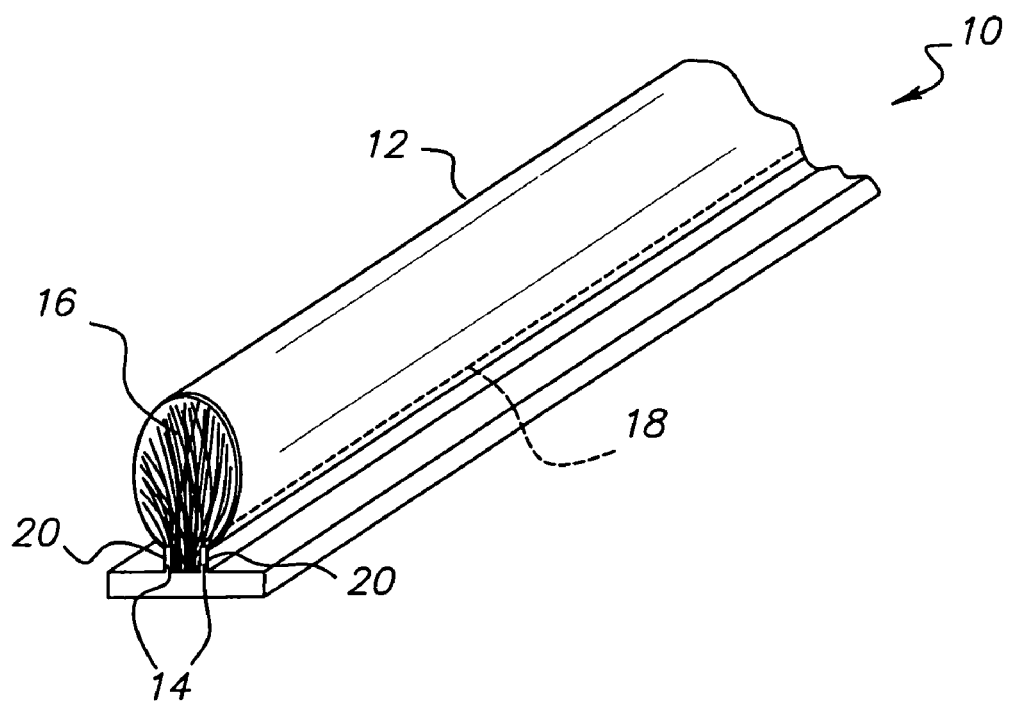
FIG. 2 is a perspective view illustrating two embodiments of the weatherstrip provided by the invention.

After the covering 12 is looped around the pile sealing member 16 and ultrasonically welded along area 20 to the outsides of the pile directors 14 around the pile sealing member 16, it can be perforated to provide lines of spaced perforations 18 in the area of pile directors just above the upper edges of pile directors 14 (see FIG. 2). The completed weatherstrip with its releasable covering 12 may be wound on a packing reel for storage or shipment.

Thus, two lines of perforations 18 in covering 12 provided on either side of the pile 16 attached to the backing strip, thereby easily enabling manual removal of such part of covering 12 above the two lines of perforations to expose the pile underneath when desired. For purposes of illustration, only one line of perforations 18 is shown in FIG. 2.

Alternatively to the use of the perforations 18, a low energy weld (or bond) of the film to the outsides of the pile directors 14 along area 20 may be provided to make the releasable attachment thereby eliminating the need for the perforations 18. Use of low energy weld to attach the covering 12 can provide easy manual removal of covering 12 to expose the pile underneath when desired.

Figure 1:
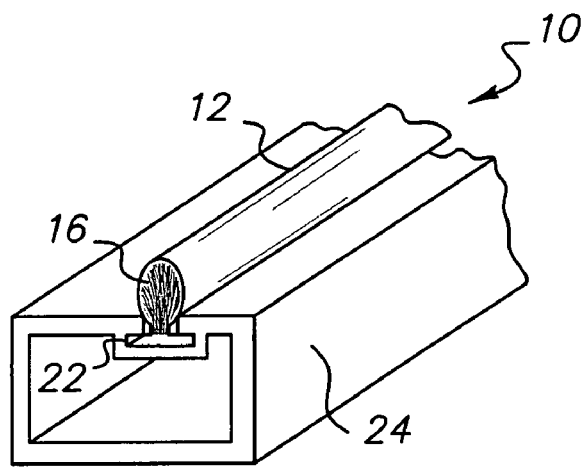
FIG. 1 is a perspective view showing an improved weatherstrip provided by the invention installed in a frame of a window or door.

The weatherseal 10 may be installed in fenestration products (e.g., windows, doors, etc.) in a T-Slot 22 of frame 24, as shown in FIG. 1, by hand, or with an automated insertion device, or online in a vinyl profile extruder used to make the frame. The covering or cladding 12 protects the pile sealing member 16 during fabrication processes. A primary application for the invention is to protect against is what is the latest trend in vinyl windows which to paint the profiles on certain surfaces to provide the consumer with more color options at a cost effective price. This process is of lower cost compared to use of colored vinyl material itself.

Painting of fenestration products wherein pile weatherstripping was installed required the installer to mask off the weatherstripping with special tape before painting. This was very labor intensive and time consuming. Sometimes the fabricator just sprayed paint over the weatherstripping which filled the pile with paint thereby losing its sealing properties.

Another problem fabricators faced is that the high air pressure used to propel the paint particles onto the surface of the fenestration product can actually loosen fibers in the pile and create a situation in which the fibers contaminate the painted surface. These problems in prior, conventional installations and painting are solved by this invention.

The covering 12 such as solid, felted or spun polyolefin, like polypropylene, may be, as discussed above, for example, a film or sheet of plastic which may be 6 mil thick, perforated just above the pile directors 14. As stated earlier, a low energy weld in the area 20 of the pile director may be alternatively used. In either case, covering 12 is easily removed as by being torn away, after being installed in a typical T-Slot retention groove 22, which is used in most vinyl or even aluminum extrusions.

The cladding or covering 12, is preferably ultrasonically welded, but could also be adhered by using conventional adhesives. More specifically, a polyolefin based sheet or film 12 ranging from 0.5 mil to 10 mil in thickness may be used for the covering, but other types of plastic or textile film could be used. Color of the film 12 indicated by hatching 24 is not critical to the actual manufacturing process, but a clear covering may be preferred by the end user so that the color of the underlying sealing members can be seen after installation.

Variations and modifications in the herein described weatherstripping and pile protective covering will undoubtedly suggest themselves to those skilled in the art. Accordingly, the foregoing description should be taken as illustrative and not in a limiting sense.

What is claimed is:

1. In a weatherstrip having a sealing member on a backing in a channel inside a pair of flanges providing pile directors adjacent to the backing and extending therefrom to top edges thereof, the improvement comprising a covering of film around said member releasably attached along releasable edges of the film along the outer side of said pile directors, said film being disposed to cover said sealing member when attached and to substantially entirely expose said sealing member when released near the top of the pile directors;
wherein:
the releasable edges are structured to releasably attach the film the outer side of the pile directors; and
the releasable edges are located so at least substantially the entire film may be entirely separated from the weatherstrip by pulling off of the weatherstrip.

2. The weatherstrip according to of claim 1 wherein of the releasable edges are formed by perforations in said film.

3. The weatherstrip according to claim 1 wherein the releasable edges are formed by a weak ultrasonic weld, provided by energy much lower than ultrasonic energy welding said sealing member to said backing in said channel.

4. The weatherstrip according to claim 1 wherein said film is from 0.5 to 10 mils in thickness.

5. The weatherstrip according to claim 1 wherein said film is of plastic or textile material.

6. The weatherstrip according to claim 5 wherein said material is selected from the group consisting of polyolefin, polyethylene, or polypropylene.

7. The weatherstrip according to claim 1 wherein said film has a color.

8. The weatherstrip according to claim 1 wherein said film is clear.

9. The weatherstrip of claim 1 wherein said film is attached to said pile directors by one of ultrasonic weld or adhesive.

10. A weatherstrip having a backing strip and a sealing member attached along the backing strip comprising:
a thin member covering said sealing member along said backing strip in which said thin member is releasably attached adjacent to the backing strip by means enabling removal of substantially all of said thin member from the weatherstrip to entirely expose said sealing member;
wherein said means is provided by a line of perforations along each side of the sealing member which extends near said backing strip adjacent to said backing strip.

11. The weatherstrip according to claim 10 wherein said means is provided by a releasable bond attaching said thin member to said backing strip along each said of the sealing member such that said sealing member is exposed adjacent to said backing strip.

12. The weatherstrip according to claim 10 wherein the backing strip has a pair of flanges extending upwardly therefrom adjacent thereto to top edges thereof between which extends said sealing member, and said thin member is releasably attached to the flanges near the top edges thereof.

13. A weatherseal comprising:
an elongated weatherseal base portion;
a pile portion;
a removable cover member;
a first tearable seam; and
a second tearable seam;
wherein:
the pile portion is mechanically connected to and extends from the weatherseal base portion;
the cover member includes an first elongated edge and a second elongated edge, with the first elongated edge being at least substantially parallel to the second elongated edge;
the first tearable seam detachably attaches the first elongated edge of the cover member to the weatherseal base portion;
the second tearable seam detachably attaches the second elongated edge of the cover member to the weatherseal base portion;
the first and second tearable seams are located and/or oriented so that the removable cover member at least substantially covers the pile portion; and
the first and second tearable seams are located, sized, shaped and/or oriented so that the cover member is at least substantially completely separated from the weatherseal base portion after the first and second seams are torn by pulling off the cover member.

14. The weatherseal of claim 13 wherein:
the first hand-tearable seam comprises perforations in the cover member; and
the second hand-tearable seam comprises perforations in the cover member.

* * * * *